United States Patent [19]

Burns et al.

[11] Patent Number: 5,789,495

[45] Date of Patent: Aug. 4, 1998

[54] METHOD FOR MAKING HYDROPHOBIC ORGANOSILICATE-MODIFIED SILICA GELS UNDER NEUTRAL CONDITIONS

[75] Inventors: Gary Thomas Burns; Qin Deng; James Richard Hahn; Clifford Carlton Reese, all of Midland, Mich.

[73] Assignee: Dow Corning Corporation, Midland, Mich.

[21] Appl. No.: 806,011

[22] Filed: Feb. 24, 1997

[51] Int. Cl.⁶ .................................................. C08F 283/00
[52] U.S. Cl. .................................... 525/477; 525/478
[58] Field of Search .................................... 525/478, 477

[56] References Cited

U.S. PATENT DOCUMENTS

| | | |
|---|---|---|
| 2,892,797 | 6/1959 | Alexander et al. . |
| 3,015,645 | 1/1962 | Tyler . |
| 3,024,126 | 3/1962 | Brown . |
| 3,122,520 | 2/1964 | Lentz . |
| 3,850,971 | 11/1974 | Termin et. al. . |
| 3,979,546 | 9/1976 | Lewis . |
| 4,006,175 | 2/1977 | Termin et al. . |
| 4,360,388 | 11/1982 | Nauroth et. al. . |

FOREIGN PATENT DOCUMENTS

| | | |
|---|---|---|
| 0 658 513 A1 | 6/1995 | Germany . |
| 0 690 023 A2 | 6/1995 | Germany . |

OTHER PUBLICATIONS

Brunauer Emmett and Teller, Jour. Am., Chem. Soc., 60:309 (1938).

*Primary Examiner*—Melvyn I. Marquis
*Attorney, Agent, or Firm*—William F. Boley

[57] ABSTRACT

The present invention is hydrophobic organosilicate-modified silica gels and a method for their preparation under neutral conditions. The method comprises two steps, where in the first step the pH of an organosilicate-modified silica hydrosol is adjusted with a base to within a range of about pH 3 to pH 7 to facilitate formation of an organosilicate-modified silica hydrogel. In the second step the organosilicate-modified silica hydrogel is contacted with an organosilicon compound in the presence of a catalytic amount of a strong acid to effect hydrophobing of the organosilicate-modified silica hydrogel to form a hydrophobic organosilicate-modified silica gel having a surface area within a range of about 100 m²/g to 850 m²/g in the dry state. In a preferred process the hydrophobic organosilicate-modified silica hydrogel is contacted with a sufficient quantity of a water-immiscible organic solvent to convert the hydrophobic organosilicate-modified silica hydrogel into a hydrophobic organosilicate-modified silica organogel. A water soluble compound of cerium or iron may be added in the second step to improve the heat stability of the hydrophobic organosilicate-modified silica gel.

27 Claims, No Drawings

METHOD FOR MAKING HYDROPHOBIC ORGANOSILICATE-MODIFIED SILICA GELS UNDER NEUTRAL CONDITIONS

BACKGROUND OF INVENTION

The present invention is hydrophobic organosilicate-modified silica gels and a method for their preparation under neutral conditions. The method comprises two steps, where in the first step the pH of an organosilicate-modified silica hydrosol is adjusted with a base to within a range of about pH 3 to pH 7 to facilitate formation of an organosilicate-modified silica hydrogel. In the second step the organosilicate-modified silica hydrogel is contacted with an organosilicon compound in the presence of a catalytic amount of a strong acid to effect hydrophobing of the organosilicate-modified silica hydrogel to form a hydrophobic organosilicate-modified silica gel having a surface area within a range of about 100 $m^2/g$ to 850 $m^2/g$ in the dry state. In a preferred process the hydrophobic organosilicate-modified silica hydrogel is contacted with a sufficient quantity of a water-immiscible organic solvent to convert the hydrophobic organosilicate-modified silica hydrogel into a hydrophobic organosilicate-modified silica organogel. The organic solvent can then be removed from the organogel to form a hydrophobic organosilicate-modified silica gel having a surface area within a range of about 100 $m^2/g$ to 850 $m^2/g$ in the dry state. A water soluble compound of cerium or iron may be added in the second step to improve the heat stability of the hydrophobic organosilicate-modified silica gel.

Although hydrophobic organosilicate-modified silica gels prepared by the present method are useful in many applications such as thermal insulation, reinforcing and extending filler in natural rubbers, and as filler in floatation devices, they are particularly useful as reinforcing fillers in silicone rubber compositions. It is well known that silicone rubbers formed from the vulcanization of polydiorganosiloxane fluids or gums alone generally have low elongation and tensile strength values. One means for improving the physical properties of such silicone rubbers involves the incorporation of a reinforcing silica filler into the fluid or gum prior to curing. However, silica reinforcing fillers have a tendency to interact with the polydiorganosiloxane fluid or gum causing a phenomenon typically referred to as "crepe hardening." A great deal of effort has been made in the past to treat the surface of reinforcing silica fillers with organosilanes or organosiloxanes to make the surface of the silica hydrophobic. This surface treatment reduces or diminishes the tendency of the compositions to crepe harden and improves the physical properties of the cured silicone rubber.

Brown, U.S. Pat. No. 3,024,126, teaches a method for making a pre-formed reinforcing silica filler hydrophobic by treating it in an organic solvent with an organosilicon compound, such as an organosilane or low-molecular weight organosiloxane containing 0.1 to 2 total hydroxyl and/or alkoxy radicals per silicon atom, and a small amount of amine, quaternary ammonium, or organometallic compound.

Lewis, U.S. Pat. No. 3,979,546, teaches a method for making the surface of reinforcing silica fillers hydrophobic through the use of alpha-alkoxy-omega-siloxanols with alcohols under mild conditions. The fillers taught are preformed solids.

Tyler, U.S. Pat. No. 3,015,645, teaches the making of hydrophobic silica powders by reacting an organosilicon compound such as dimethyldichlorosilane or trimethylmethoxysilane with an silica organogel in the presence of an acidic catalyst and then removing the volatile materials. The method requires the preparation of a silica hydrogel which is converted to a silica organogel by replacing the water in the silica hydrogel with an organic solvent.

Lentz, U.S. Pat. No. 3,122,520, teaches a procedure where an acidic silica hydrosol is first heated to develop a reinforcing silica structure and then mixed with an organosilicon compound, an acid catalyst, and a water-immiscible organic solvent to produce a hydrophobic silica filler. The organosilicon compounds taught by Lentz are limited to those compounds in which the organic radicals bonded to silicon atoms have less than 6 carbon atoms, organosilicon compounds having no organofunctional substituents bonded to silicon atoms, and to organosilicon compounds having no hydrogen bonded to silicon atoms.

Alexander et al., U.S. Pat. No. 2,892,797, describe silica sols modified by treatment with a solution of a metalate so that the silica particles are coated with no more than a molecular layer of a combined metal which forms an insoluble silicate at a pH between 5 and 12. Aluminum, tin, zinc, and lead are taught as the preferred metals. Alexander et al. teach that silica sols which carry a metal upon the surface of the particles according to their invention have increased stability at pH extremes.

Termin et al., U.S. Pat. No. 3,850,971, and Termin et al. U.S. Pat. No. 4,006,175 teach that porous silicic acid having a specific surface area of about 50 $m^2/g$ to 1000 $m^2/g$ can be made by hydrolyzing methyl or ethyl silicate or polymethyl or polyethyl silicate with about 70 to 120% of the stoichiometric amount of water with moderate stirring. Termin et al. teach that transition metals such as iron oxides and chromium oxides may be used as hydrolysis activators and that such metals may appear in the end product.

Nauroth et al., U.S. Pat. No. 4,360,388, teach cerium containing precipitated silica. Nauroth et al. teach that silicone rubber compositions reinforced with the cerium containing precipitated silica exhibit excellent heat stability and that the cerium containing precipitated silica acts as a fire retardant agent.

Jensen et al., EP 0-690-023 A2, teach the formation of silica gels by adding base to an aqueous waterglass solution and aging of the silica gels at a pH of 4 to 11 prior to a hydrophobing step. The described silica gels are not organosilicate modified.

Jensen et al., EP 0-658,531 A1, teach the formation of silica gels by adding base to an aqueous waterglass solution and the aging of the silica gels at a pH of 6 to 11 prior to a hydrophobing step. The described silica gels are not organosilicate modified.

The hydrophobic organosilicate-modified silica gels prepared by the present method have improved hydrophobicity when compared to hydrophobic silica gels prepared without the presence of the organosilicate. The improved hydrophobicity can make the hydrophobic organosilicate-modified silica gels more compatible with organic rubber and silicone rubber compositions. The hydrophobic organosilicate-modified silica gels also have a lower refractive index, which makes them desirable for use in silicone rubber compositions requiring optical clarity. The neutral conditions for preparing the organosilicate-modified silica hydrogels provide advantages over a method where the silica hydrogel is prepared under strong acid conditions. The advantages include reduced use of acid in the method, the ability to use less acid resistant process equipment, and faster conversion of the organosilicate-modified silica hydrosol into the corresponding silica hydrogel.

SUMMARY OF INVENTION

The present invention is hydrophobic organosilicate-modified silica gels and a method for their preparation under neutral conditions. The method comprises two steps, where in the first step the pH of an organosilicate-modified silica hydrosol is adjusted with a base to within a range of about pH 3 to pH 7 to facilitate formation of an organosilicate-modified silica hydrogel. In the second step the organosilicate-modified silica hydrogel is contacted with an organosilicon compound in the presence of a catalytic amount of a strong acid to effect hydrophobing of the organosilicate-modified silica hydrogel to form a hydrophobic organosilicate-modified silica organogel having a surface area within a range of about 100 m$^2$/g to 850 m$^2$/g in the dry state. In a preferred process the hydrophobic organosilicate-modified silica hydrogel is contacted with a sufficient quantity of a water-immiscible organic solvent to convert the hydrophobic organosilicate-modified silica hydrogel into a hydrophobic organosilicate-modified silica organogel. The organic solvent can be removed from the hydrophobic organosilicate-modified silica organogel to form a hydrophobic organosilicate-modified silica gel having a surface area within a range of about 100 m$^2$/g to 850 m$^2$/g in the dry state.

DESCRIPTION OF INVENTION

The present invention is hydrophobic organosilicate-modified silica gels and a method for their preparation under neutral conditions. The method for preparing the hydrophobic organosilicate-modified silica gels comprises:

(A) adjusting the pH of an organosilicate-modified silica hydrosol comprising (i) about 2 to 50 weight percent of SiO$_2$ and (ii) about 1 to 50 weight percent of an organosilicate described by formula R$^1$SiO$_{3/2}$, where R$^1$ is a monovalent hydrocarbon radical comprising about 1 to 6 carbon atoms, with a base to within a range of about pH 3 to pH 7 at a temperature within a range of about 10° C. to 250° C. to facilitate formation of an organosilicate-modified silica hydrogel, and (B) contacting the organosilicate-modified silica hydrogel with (1) a catalytic amount of a strong acid and (2) an organosilicon compound selected from the group consisting of organosilanes described by formula

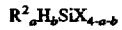  (1)

and organosiloxanes described by formula

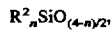  (2)

where each R$^2$ is independently selected from a group consisting of hydrocarbon radicals comprising about 1 to 12 carbon atoms and organofunctional hydrocarbon radicals comprising about 1 to 12 carbon atoms, each X is independently selected from a group consisting of halogen and alkoxy radicals comprising about 1 to 12 carbon atoms, a=0, 1, 2, or 3, b=0 or 1, a+b=1, 2, or 3 with the proviso that when b=1 then a+b=2 or 3, and n is an integer of from 2 to 3 inclusive to form a hydrophobic organosilicate-modified silica hydrogel having a surface area within a range of about 100 m$^2$/g to 850 m$^2$/g as measured in the dry state.

The method of the present invention is a two-step procedure, comprising steps (A) and (B) for making hydrophobic organosilicate-modified silica gels. Step (A) of the method comprises adjusting the pH of an organosilicate-modified silica hydrosol with a base to form an organosilicate-modified silica hydrogel. Step (B) comprises contacting the organosilicate-modified silica hydrogel prepared in step (A) with an organosilicon compound which reacts with the organosilicate-modified silica hydrogel to give a hydrophobic organosilicate-modified silica hydrogel. In a preferred process the hydrophobic organosilicate-modified hydrogel is contacted with sufficient water-immiscible organic solvent to convert the hydrogel to the corresponding organogel. The water-immiscible organic solvent can then be removed from the hydrophobic organosilicate-modified silica organogel to form a hydrophobic organosilicate-modified silica gel. Hydrophobic organosilicate-modified silica gels prepared by the present method are useful as reinforcing fillers in, for example, silicone rubber and organic rubber compositions.

The method used to prepare the organosilicate-modified silica hydrosol is not critical and can be any of those known in the art. The organosilicate-modified silica hydrosol may be prepared, for example, by first preparing a silica hydrosol and then mixing the silica hydrosol with an organosilicate as described herein and acidifying the mixture. The organosilicate-modified silica hydrosol may be prepared, for example, by mixing a silica hydrosol with an acidified organosilicate. The organosilicate-modified silica hydrosol may be prepared by forming a mixture of sodium silicate and the organosilicate and acidying the mixture. Silica hydrosols useful for preparing the organosilicate-modified silica hydrosol can be prepared by for example deionizing sodium silicate by a method such as the use of an ion exchange resin. The silica hydrosol may be prepared by hydrolyzing a silane at a low temperature. The silica hydrosol may be prepared by acidifying a sodium silicate mixture.

Organosilicates useful in the present method are described by formula R$^1$SiO$_{3/2}$, where R$^1$ is a monovalent hydrocarbon radical comprising about 1 to 6 carbon atoms. R$^1$ can be, for example, alkyls such as methyl, ethyl, and hexyl; substituted alkyls such as 3,3,3-trifluoropropyl and chloromethyl; alkenyls such as vinyl, allyl, and hexenyl; and aryls such as phenyl.

The organosilicate-modified silica hydrosol requires the presence of about 2 to 50 weight percent of SiO$_2$. Preferred is when the organosilicate-modified silica hydrosol comprises about 5 to 20 weight percent of SiO$_2$. The organosilicate-modified silica hydrosol also requires the presence of about 1 to 50 weight percent of an organosilicate described by formula R$^1$SiO$_{3/2}$, where R$^1$ is as described above. Preferred is when the organosilicate-modified silica hydrosol comprises about 1 to 20 weight percent of the organosilicate.

In step (A), the pH of the organosilicate-modified silica hydrosol is adjusted to within a range of about pH 3 to pH 7 by addition of a base to facilitate formation of an organosilicate-modified silica hydrogel. Preferably, the pH of the organosilicate-modified silica hydrosol is adjusted by means of a base to within a range of about pH 3.5 to pH 6. For the purpose of this invention any base can be used. The base can be, for example, an inorganic base such as NH$_4$OH, NaOH, KOH, and Na$_2$O(SiO$_2$)$_{3.36}$.

The temperature at which step (A) is conducted can be within a range of about 10° C. to 250° C. Preferred is when step (A) is conducted at a temperature within a range of about 75° C. to 150° C. Even more preferred is when step (A) is conducted at a temperature within a range of about 90° C. to 110° C.

In step (A), the length of time required for the organosilicate-modified silica hydrosol to convert to the corresponding silica hydrogel varies with the temperature and pH. Generally the higher the temperature and the higher the pH the shorter the length of time needed. Step (A) must be continued until the organosilicate-modified silica hydrogel acquires a structure such that the final product after hydrophobing has a surface area in the dry state within a range of about 100 m$^2$/g to 850 m$^2$/g as determined by the Brunauer Emmett and Teller (BET) method described in the Jour. Am. Chem. Soc. 60:309 (1938) and as further described in Lentz, U.S. Pat. No. 3,122,520, which is hereby incorporated by reference for such a teaching.

The surface area of the organosilicate-modified silica hydrogel at the conclusion of step (A) is immaterial provided it is such that the surface area of the dried product after the hydrophobing of step (B) is within the above described range. Generally the surface area of the organosilicate-modified silica hydrogel is reduced by the hydrophobing reaction, since the organosilyl groups which become attached to the surface of the organosilicate-modified silica hydrogel increase the average particle size. The surface of the organosilicate-modified silica hydrogel can be above 850 m$^2$/g provided that the hydrophobing treatment brings it within a range of about 100 m$^2$/g to 850 m$^2$/g.

To determine the proper contact conditions during conduct of step (A) it is necessary to proceed with the hydrophobing of step (B) and then measure the surface area of the resulting product in the dry state. If the surface area of the resulting product in the dry state is above 850 m$^2$/g, then the contacting conditions of step (A) were too mild. If the surface area of the resulting product in the dry state is below 100 m$^2$/g, then the contacting conditions of step (A) were too severe. Examples of suitable pH conditions, temperatures, and times for conduct of step (A) are provided in the Examples herein. If the surface area of the hydrophobic organosilicate-modified silica gel in the dry state is above or below the described range, the hydrophobic organosilicate-modified silica gels have diminished reinforcing properties in silicone elastomers.

In an alternative embodiment of the present method, the organosilicate-modified silica hydrogel of step (A) can be aged at a pH within a range of about pH 3.5 to pH 8. Preferred is when the organosilicate-modified silica hydrogel is aged at a pH within a range of about pH 6 to pH 7.5. If necessary, the pH of the organosilicate-modified silica hydrogel can be adjusted for aging to within the described ranges by use of a strong base such as previously described for use in step (A). Generally, the organosilicate-modified silica hydrogel can be aged at a temperature within a range of about 0° C. to 250° C. It is preferred that the organosilicate-modified silica hydrogel be aged at a temperature within a range of about 20° C. to 150° C. Most preferred is when the organosilicate-modified silica hydrogel is aged at a temperature within a range of about 80° C. to 130° C. The length of time for aging the organosilicate-modified silica hydrogel can be from about 10 minutes to 76 hours or longer. A preferred length of time for aging the organosilicate-modified silica hydrogel is within a range of about 1 hour to 24 hours.

If desired, the organosilicate-modified silica hydrogel of step (A) may be subjected to a shearing force to reduce aggregate particle size and to create a more uniform particle size distribution prior to the conduct of the hydrophobing reaction of step (B). If shearing is conducted, it is preferred that shearing of the organosilicate-modified silica hydrogel be performed after any aging of the silica hydrogel is completed. The shearing force may be applied to the organosilicate-modified silica hydrogel by any of those methods known in the art. The shearing force may be applied, for example, by a mechanical means such as a high-speed mixer or by ultrasound. This reduction in aggregate particle size and improved uniformity in particle size distribution can provide for hydrophobic organosilicate-modified silica gels which when compounded into silicone elastomer compositions provide for lower viscosity compositions, more stable compositions, and for cured silicone elastomers having improved clarity and physical properties.

In step (B) of the present method the organosilicate-modified silica hydrogel of step (A) is contacted with one or more of the defined organosilicon compounds described by formula (1) and (2) in the presence of a catalytic amount of a strong acid and an organic solvent immiscible with water. The catalytic amount of strong acid can be added either prior to, simultaneously with, or subsequent to the addition of the organosilicon compound. In the case where the organosilicon compound is, for example, a chlorosilane, the catalytic amount of the strong acid can be generated in situ by hydrolysis of the chlorosilane or the reaction of the chlorosilane directly with hydroxyls of the organosilicate-modified silica hydrogel. By the term "catalytic amount" it is meant that the strong acid is present in an amount sufficient to effect reaction of the organosilicon compound with the organosilicate-modified silica hydrogel. Examples of useful acids include hydrochloric, hydroiodic, nitric, phosphoric, sulfuric, and benzene sulfonic acids. It is preferred that in step (B) the strong acid catalyst provide a pH less than about 2.5.

The temperature at which the hydrophobing of step (B) is conducted is not critical and can be from about 20° C. to 250° C. Generally, it is preferred that the hydrophobing of step (B) be conducted at a temperature within a range of about 30° C. to 150° C. The hydrophobing of step (B) can be conducted at the reflux temperature of the water-immiscible organic solvent when it is present during hydrophobing.

In step (B), the organosilicate-modified silica hydrogel of step (A) is reacted with an organosilicon compound described by formula (1) or (2). In formula (1) and (2), each R$^2$ can be independently selected from a group consisting of hydrocarbon radicals comprising about 1 to 12 carbon atoms and organofunctional hydrocarbon radicals comprising about 1 to 12 carbon atoms. R$^2$ can be a saturated or unsaturated hydrocarbon radical. R$^2$ can be a substituted or non-substituted hydrocarbon radical. R$^2$ can be, for example, alkyl radicals such as methyl, ethyl, t-butyl, hexyl, heptyl, octyl, decyl, and dodecyl; alkenyl radicals such as vinyl, allyl, and hexenyl; substituted alkyl radicals such as chloromethyl, 3,3,3-trifluoropropyl, and 6-chlorohexyl; and aryl radicals such as phenyl, naphthyl, and tolyl. R$^2$ can be an organofunctional hydrocarbon radical comprising about 1 to 12 carbon atoms where, for example, the functionality is mercapto, disulfide, polysulfide, amino, carboxylic acid, carbinol, ester, or amido. A preferred organofunctional hydrocarbon radical is one having mercapto functionality.

In formula (1) each X is independently selected from a group consisting of halogen and alkoxy radicals comprising about 1 to 12 carbon atoms. When X is a halogen, it is preferred that the halogen be chlorine. When X is an alkoxy radical, X may be, for example, methoxy, ethoxy, and propoxy. Preferred is where each X is selected from a group consisting of chlorine atoms and methoxy.

The viscosity of the organosiloxanes described by formula (2) is not limiting and can range from that of a fluid to a gum. Generally, higher molecular weight organosiloxanes will be cleaved by the acidic conditions of the present method allowing them to react with the organosilicate-modified silica hydrogel.

The organosilicon compound may be provided to the present method as a single compound as described by formulas (1) or (2) or as a mixture of two or more organosilicon compounds described by formulas (1) and (2).

Examples of useful organosilicon compounds include diethyldichlorosilane, allylmethyldichlorosilane, methylphenyldichlorosilane, phenylethyldiethoxysilane, 3,3,3-trifluoropropylmethyldichlorosilane, trimethylbutoxysilane, sym-diphenyltetramethyldisiloxane, trivinyltrimethylcyclotrisiloxane, hexaethyldisiloxane, pentylmethyldichlorosilane, divinyldipropoxysilane, vinyldimethylchlorosilane, vinylmethyldichlorosilane, vinyldimethylmethoxysilane, trimethylchlorosilane, hexamethyldisiloxane, hexenylmethyldichlorosilane, hexenyldimethylchlorosilane, dimethylchlorosilane, dimethyldichorosilane, mercaptopropylmethyldimethoxysilane, and bis{3-(triethoxysilyl)propyl}tetrasulfide. When the hydrophobic organosilicate-modified silica gel is to be used as a filler in silicone rubber, it is preferred that the organosilicon compound be hexamethyldisiloxane or dimethyldichlorosilane.

The amount of organosilicon compound added to the method is that sufficient to adequately hydrophobe the organosilicate-modified silica hydrogel to provide a hydrophobic organosilicate-modified silica gel suitable for its intended use. Generally the organosilicon compound should be added to the method in an amount such that there is at least 0.04 organosilyl unit per $SiO_2$ unit in the organosilicate-modified silica hydrogel. The upper limit of the amount of organosilicon compound added to the process is not critical since any amount in excess of the amount required to saturate the organosilicate-modified silica hydrogel will act as a solvent for the method.

The hydrophobic organosilicate-modified silica hydrogel of step (B) may be used as is or may be recovered for use by such methods as centrifugation or filtration. The hydrophobic organosilicate-modified silica hydrogel may be dried by the use of such methods as heating or reducing pressure or a combination of both heating and reducing pressure.

In a preferred method a water-immiscible organic solvent in sufficient amount to convert the organosilicate-modified silica hydrogel or hydrophobic organosilicate-modified silica hydrogel to the corresponding organogel is added to the method. The organic solvent can be added prior to, simultaneously with, or subsequent to the addition of the organosilicon compound. That is, the organosilicate-modified silica hydrogel can be first converted into an organogel by replacement of the water with the organic solvent and then hydrophobed. On the other hand, the organosilicon compound and the organic solvent can be added simultaneously to the organosilicate-modified silica hydrogel. Under these conditions the reaction of the organosilicate-modified silica hydrogel with the organosilicon compound and the replacement of the water in the hydrophobic organosilicate-modified silica hydrogel with the organic solvent may occur simultaneously. Finally the organosilicon compound can be added prior to the organic solvent, in which case the organosilicate-modified silica hydrogel reacts with the organosilicon compound and the resulting product is then converted into an organogel by an addition of an organic solvent. In the latter two cases, the conversion to an organogel is accomplished by a phase separation in which the hydrophobic organosilicate-modified silica hydrogel passes into the organic solvent phase. A preferred method is where a water-immiscible organic solvent is added after formation of the hydrophobic organosilicate-modified silica hydrogel thereby effecting formation of the corresponding hydrophobic organogel.

For purpose of this invention any organic solvent immiscible with water can be employed. Suitable solvents include low molecular weight siloxanes such as hexamethyldisiloxane, octamethylcyclotetrasiloxane, diphenyltetramethyldisiloxane and trimethylsilyl endblocked dimethylpolysiloxane fluids. When a siloxane is employed as a solvent it may serve both as a solvent and as a reactant with the organosilicate-modified silica hydrogel. In addition, suitable solvents include aromatic hydrocarbons such as toluene and xylene; heptane and other aliphatic hydrocarbon solvents; cycloalkanes such as cyclohexane; ethers such as diethylether and dibutylether; and halohydrocarbon solvents such as methylene chloride, chloroform, ethylene chloride, and chlorobenzene.

The amount of water-immiscible organic solvent is not critical so long as there is sufficient solvent to convert the hydrophobic organosilicate-modified silica hydrogel into a silica organogel. Preferably the water-immiscible organic solvent should have a boiling point below about 250° C. to facilitate its removal from the hydrophobic organosilicate-modified silica organogel, however the boiling point is not critical since the solvent may be removed from the hydrophobic organosilicate-modified silica organogel by centrifuging or other suitable means.

After the organosilicate-modified silica hydrogel has been converted to the hydrophobic organosilicate-modified silica organogel the resulting product may be employed per se. That is the hydrophobic organosilicate-modified silica organogel may be used directly as a reinforcing agent in silicone rubber or in any other uses for which this type of product can be used. Alternatively, the water-immiscible organic solvent may be removed from the hydrophobic organosilicate-modified silica organogel and the resulting dry hydrophobic organosilicate-modified silica gel used.

During the conduct of step (B) it may be desirable to add a surfactant or water miscible solvent to facilitate the reaction of the organosilicon compound with the organosilicate-modified silica hydrogel. Suitable surfactants can include, for example, anionic surfactants such as dodecylbenzene sulfonic acid, nonionic surfactants such as polyoxyethylene(23)lauryl ether and $(Me_3SiO)_2MeSi(CH_2)_3(OCH_2CH_2)_7OMe$ where Me is methyl, and cationic surfactants such as N-alkyltrimethyl ammonium chloride. Suitable water miscible solvents can include, for example, alcohols such as ethanol, propanol, isopropanol, and tetrahydrofuran.

In step (B) of the present method an effective amount of a heat stabilizing agent selected from a group consisting of water soluble compounds of cerium and iron may be added. By the term "effective amount" it is meant that the water soluble compound of cerium or iron is present in the hydrophobic organosilicate-modified silica gel product of the present method at a concentration sufficient to provide improved heat stability to those compositions in which the hydrophobic organosilicate-modified silica gel is incorporated. Such compositions can include, for example, silicone rubber, natural rubber, and synthetic organic rubber.

Generally, about 0.01 percent weight/volume (% Wt./Vol.) to 10% Wt./Vol. of the water soluble compound of cerium or iron in relation to the volume of components in step (B), excluding any solvents, is considered useful in the present process. Preferred is where the water soluble compound of cerium or iron comprises about 0.1% Wt./Vol. to 1% Wt./Vol. on the same basis.

Examples of water soluble compounds which may be useful in the present method include $FeCl_3$, $FeBr_2$, $FeBr_3 \cdot 6H_2O$, $FeCl_2 \cdot 4H_2O$, $FeI_2 \cdot 4H_2O$, $Fe(NO_3)_3 \cdot 6H_2O$, $FePO_4 \cdot 2H_2O$, $CeCl_3 \cdot 9H_2O$, $CeBr_3 \cdot H_2O$, $CeI_3 \cdot 9H_2O$, $Ce(NO_3)_3 \cdot 6H_2O$, and $Ce(SO_4)_2 \cdot 2H_2O$. A preferred water soluble compound of cerium and iron for use in the present method is selected from the group consisting of $FeCl_3$ and $CeCl_3 \cdot 9H_2O$.

The following examples are provided to illustrate the present invention. These examples are not intended to limit the scope of the present claims.

Example 1

An organosilicate-modified silica gel prepared and aged at pH 4, hydrophobed with hexamethyldisiloxane, and having incorporated therein $FeCl_3$ as a heat stabilizing agent was prepared. A solution was prepared comprising 250 ml of PQ N Clear Sodium Silicate (PQ Corporation, Valley Forge, Pa.), 112 ml of sodium methyl silicate (DC® 722, Dow Corning Corporation, Midland, Mich.), and 759 ml of deionized water. This solution was added to a rapidly stirred solution, in a 5 L glass flask, comprising 129 ml of concentrated HCl (Fisher Certified, Fisher Scientific, Fair Lawn, N.J.) diluted with 352 ml of deionized water. The solution was adjusted to pH 4 by use of a dilute solution of PQ N Clear Sodium Silicate (PQ Corporation) and sodium methyl silicate (DC 722) in deionized water. An organosilicate-modified silica hydrogel was formed after stirring 70 minutes. The organosilicate-modified silica hydrogel was aged by stirring an additional 3 hours at room temperature.

After aging, to the organosilicate-modified silica hydrogel, with stirring in the 5 L flask, was added 582 ml of concentrated HCl (Fisher Certified), 727 ml of isopropanol, 376 ml of hexamethyldisiloxane, and 4.2 g of $FeCl_3$. After stirring the flask content for 1 hour at room temperature, 1 L of toluene was added. After stirring the flask content for an additional 2 to 3 minutes, stirring was stopped and the aqueous phase drained from the flask. 250 ml of isopropanol and 50 ml of deionized water were added to the flask and the content of the flask rapidly stirred for 2 minutes. Then, 700 ml of deionized water were added to the flask and after stirring the flask content an additional 2 minutes the aqueous phase was drained from the flask.

The flask was fitted with a Dean-Stark trap and the toluene phase refluxed to remove residual water. The toluene phase was poured into glass pans and the toluene evaporated leaving as product a hydrophobic organosilicate-modified silica gel. The organosilicate-modified hydrophobic silica gel was further dried 14 hours at 150° C. The yield of dried hydrophobic organosilicate-modified silica gel was 177 g. The BET surface area of the dried hydrophobic organosilicate-modified silica gel was determined by the method described supra; void volume, pore volume, average pore diameter, and particle size were characterized by standard methods; and carbon content was determined by CHN analysis using a Perkin Elmer Model 2400 CHN Elemental Analyzer (Perkin Elmer Corporation, Norwalk, Conn.). The result of these analysis are reported in Table 1.

Example 2

An organosilicate-modified silica gel prepared and aged at pH 4, hydrophobed with hexamethyldisiloxane, and having incorporated therein $FeCl_3$ as a heat stabilizing agent was prepared. A solution was prepared comprising 250 ml of PQ N Clear Sodium Silicate (PQ Corporation), 112 ml of sodium methyl silicate (DC® 722), and 759 ml of deionized water. This solution was added to a rapidly stirred solution, in a 5 L glass flask, comprising 129 ml of concentrated HCl (Fisher Certified) diluted with 352 ml of deionized water. The pH of the solution was adjusted to 4 by use of a dilute solution of PQ N Clear Sodium Silicate (PQ Corporation) and sodium methyl silicate (DC 722) in deionized water. The solution was heated at 85° C. for 40 minutes, with stirring, to form an organosilicate-modified silica hydrogel. The organosilicate-modified silica hydrogel was aged by stirring an additional 16 minutes at 85° C.

After aging, to the organosilicate-modified silica hydrogel, with stirring in the 5 L flask, was added 582 ml of concentrated HCl (Fisher Certified), 727 ml of isopropanol, 376 ml of hexamethyldisiloxane, and 4.2 g of $FeCl_3$. After stirring the flask content for 1 hour at room temperature, 1 L of toluene was added. After stirring the flask content for an additional 2 to 3 minutes, stirring was stopped and the aqueous phase drained from the flask. 250 ml of isopropanol and 50 ml of deionized water were added to the flask and the content of the flask rapidly stirred for 2 minutes. Then, 700 ml of deionized water were added to the flask and after stirring an additional 2 minutes the aqueous phase was drained from the flask.

The flask was fitted with a Dean-Stark trap and the toluene phase refluxed to remove residual water. The toluene phase was poured into glass pans and the toluene evaporated leaving as product a hydrophobic organosilicate-modified silica gel. The organosilicate-modified hydrophobic silica gel was dried 14 hours at 150° C. The yield of dried hydrophobic organosilicate-modified silica gel was 167 g.

The hydrophobic organosilicate-modified silica gel was characterized by the methods described in Example 1 and the results are provided in Table 1.

Example 3

An organosilicate-modified silica gel prepared and aged at pH 4, hydrophobed with hexamethyldisiloxane, and having incorporated therein $FeCl_3$ as a heat stabilizing agent was prepared. A solution was prepared comprising 250 ml of PQ N Clear Sodium Silicate (PQ Corporation), 112 ml of sodium methyl silicate (DC® 722), and 759 ml of deionized water. This solution was added to a rapidly stirred solution, in a 5 L glass flask, comprising 129 ml of concentrated HCl (Fisher Certified) diluted with 352 ml of deionized water. The solution was adjusted to pH 4 by use of a dilute solution of PQ N Clear Sodium Silicate (PQ Corporation) and sodium methyl silicate (DC 722) in deionized water. The solution was heated at 100° C. for 40 minutes, with stirring, to form an organosilicate-modified silica hydrogel. The organosilicate-modified silica hydrogel was aged by stirring an additional 30 minutes at 100° C.

After aging, to the organosilicate-modified silica hydrogel, with stirring in the 5L flask, was added 582 ml of concentrated HCl (Fisher Certified), 727 ml of isopropanol, 376 ml of hexamethyldisiloxane, and 4.2 g of $FeCl_3$. After stirring the flask content for 1 hour at room temperature, 1 L of toluene was added. After stirring the flask content for an additional 2 to 3 minutes, stirring was stopped and the aqueous phase drained from the flask. 250 ml of isopropanol and 50 ml of deionized water were added to the flask and the content of the flask rapidly stirred for 2 minutes. Then, 700 ml of deionized water were added to the flask and after stirring an additional 2 minutes the aqueous phase was drained from the flask.

The flask was fitted with a Dean-Stark trap and the toluene phase refluxed to remove residual water. The toluene phase was poured into glass pans and the toluene evaporated leaving as product a hydrophobic organosilicate-modified silica gel. The organosilicate-modified hydrophobic silica gel was dried 14 hours at 150° C. The yield of dried hydrophobic organosilicate-modified silica gel was 165 g.

The hydrophobic organosilicate-modified silica gel was characterized by the methods described in Example 1 and the results are provided in Table 1.

Example 4

An organosilicate-modified silica gel prepared and aged at pH 4, hydrophobed with hexamethyldisiloxane, and having incorporated therein $FeCl_3$ as a heat stabilizing agent was prepared. A solution was prepared comprising 250 ml of PQ N Clear Sodium Silicate (PQ Corporation), 112 ml of sodium methyl silicate (DC® 722), and 759 ml of deionized water. This solution was added to a rapidly stirred solution, in a 5 L glass flask, comprising 129 ml of concentrated HCl (Fisher Certified) diluted with 352 ml of deionized water. The solution was adjusted to pH 4 by use of a dilute solution of PQ N Clear Sodium Silicate (PQ Corporation) and sodium methyl silicate (DC 722) in deionized water. The solution was refluxed for 65 minutes, with stirring, to form an organosilicate-modified silica hydrogel. The organosilicate-modified silica hydrogel was aged by refluxing an additional 79 minutes.

After aging, to the organosilicate-modified silica hydrogel, with stirring in the 5 L flask, was added 582 ml of concentrated HCl (Fisher Certified), 727 ml of isopropanol, 376 ml of hexamethyldisiloxane, and 4.2 g of $FeCl_3$. After stirring the flask content for 1 hour at room temperature, 1 L of toluene was added. After stirring the flask content for an additional 2 to 3 minutes, stirring was stopped and the aqueous phase drained from the flask. 250 ml of isopropanol and 50 ml of deionized water were added to the flask and the content of the flask rapidly stirred for 2 minutes. Then, 700 ml of deionized water were added to the flask and after stirring an additional 2 minutes the aqueous phase was drained from the flask.

The flask was fitted with a Dean-Stark trap and the toluene phase refluxed to remove residual water. The toluene phase was poured into glass pans and the toluene evaporated leaving as product a hydrophobic organosilicate-modified silica gel. The organosilicate-modified hydrophobic silica gel was dried 14 hours at 150° C. The yield of dried hydrophobic organosilicate-modified silica gel was 153 g.

The hydrophobic organosilicate-modified silica gel was characterized by the methods described in Example 1 and the results are provided in Table 1.

TABLE 1

Characterization of Organosilicate-Modified Silica Gels

| Property | Example Number | | | |
|---|---|---|---|---|
| | 1 | 2 | 3 | 4 |
| BET Surface Area (m²/g) | 846 | 814 | 781 | 712 |
| Void Volume (cm³/g) | 1.98 | 5.02 | 5.54 | 5.89 |
| Pore Volume (cm³/g) | 1.17 | 2.54 | 2.73 | 2.93 |
| Ave. Pore Diameter (Å) | 44 | 90 | 98 | 111 |
| Particle Size (μm) | 105 | 75 | 58 | 53 |
| Wt. % Carbon | 15.4 | 14.0 | 13.0 | 12.6 |

We claim:

1. A method for preparing a hydrophobic organosilicate-modified silica gel comprising:
   (A) adjusting the pH of an organosilicate-modified silica hydrosol comprising (i) about 2 to 50 weight percent of $SiO_2$ and (ii) 1 to 50 weight percent of an organosilicate described by formula $R^1SiO_{3/2}$, where $R^1$ is a monovalent hydrocarbon radical comprising about 1 to 6 carbon atoms, with a base to within a range of about pH 3 to pH 7 at a temperature within a range of about 10° C. to 250° C. to facilitate formation of an organosilicate-modified silica hydrogel, and
   (B) contacting the organosilicate-modified silica hydrogel with (1) a catalytic amount of a strong acid in an amount sufficient to effect reaction of the organosilicon compound with the organosilicate-modified silica hydrogel and (2) an organosilicon compound selected from the group consisting of organosilanes described by formula

and organosiloxanes described by formula

where each $R^2$ is independently selected from a group consisting of hydrocarbon radicals comprising about 1 to 12 carbon atoms and organofunctional hydrocarbon radicals comprising about 1 to 12 carbon atoms, each X is independently selected from a group consisting of halogen and alkoxy radicals comprising 1 to 12 carbon atoms, a=0, 1, 2, or 3, b=0 or 1, a+b=1, 2, or 3 with the proviso that when b=1 then a+b=2 or 3, n is an integer of from 2 to 3 inclusive to form a hydrophobic organosilicate-modified silica hydrogel having a surface area within a range of about 100 m²/g to 850 m²/g as measured in the dry state.

2. A method according to claim 1, where $R^1$ is methyl.

3. A method according to claim 1, where the organosilicate-modified silica hydrosol comprises about 5 to 20 weight percent of $SiO_2$.

4. A method according to claim 1, where the organosilicate-modified silica hydrosol comprises about 1 to 10 weight percent of the organosilicate.

5. A method according to claim 1, where the pH of the organosilicate-modified silica hydrosol is adjusted to within a range of about 3.5 to 6.

6. A method according to claim 1, where the temperature during conduct of step (A) is within a range of about 75° C. to 150° C.

7. A method according to claim 1, where the temperature during conduct of step (A) is within a range of about 90° C. to 110° C.

8. A method according to claim 1 further comprising aging the organosilicate-modified silica hydrogel of step (A) at a pH within a range of about pH 3.5 to pH 8 and a temperature within a range of about 0° C. to 250° C. for a period of time within a range of about 10 minutes to 76 hours prior to conduct of step (B).

9. A method according to claim 1 further comprising aging the organosilicate-modified silica hydrogel of step (A) at a pH within a range of about pH 6 to pH 7.5 and a temperature within a range of about 20° C. to 150° C. for a period of time within a range of about 1 to 24 hours prior to conduct of step (B).

10. A method according to claim 9, where the temperature at which the aging is effected is within a range of about 80° C. to 130° C.

11. A method according to claim 1 further comprising shearing the organosilicate-modified silica hydrogel of step (A) prior to conduct of step (B).

12. A method according to claim 1, where the contacting of step (B) is conducted at a temperature within a range of about 30° C. to 150° C.

13. A method according to claim 1, where the organosilicon compound is an organosiloxane.

14. A method according to claim 13, where the organosiloxane is hexamethyldisiloxane.

15. A method according to claim 1, where the organosilicon compound is an organosilane.

16. A method according to claim 15, where the organosilane is selected from the group consisting of vinylmethyldichlorosilane, vinyldimethylchlorosilane, hexenyldimethylchlorosilane, hexenylmethyldichlorosilane, dimethyldichlorosilane, and bis{3-(triethoxysilyl)propyl}tetrasulfide.

17. A method according to claim 1, where the organosilicon compound provides at least 0.04 organosilyl units per $SiO_2$ unit of the silica hydrogel.

18. A method according to claim 1 further comprising contacting the hydrophobic organosilicate-modified silica hydrogel with a water-immiscible organic solvent in sufficient amount to convert the hydrophobic organosilicate-modified silica hydrogel to a hydrophobic organosilicate-modified silica organogel.

19. A method according to claim 1 further comprising during the contacting of step (B) the presence of a surfactant which facilitates reaction of the organosilicon compound with the organosilicate-modified silica hydrogel.

20. A method according to claim 1 further comprising during the contacting of step (B) the presence of a water-miscible solvent which facilitates reaction of the organosilicon compound with the organosilicate-modified silica hydrogel.

21. A method according to claim 1 further comprising mixing the silica hydrogel with an effective amount of a heat stabilizing agent selected from the group consisting of water soluble compounds of cerium and iron.

22. A method according to claim 1, where the water soluble compound is selected from the group consisting of $FeCl_3$ and $CeCl_3 \cdot 9H_2O$.

23. A composition prepared by the method of claim 1.
24. A composition prepared by the method of claim 8.
25. A composition prepared by the method of claim 11.
26. A composition prepared by the method of claim 18.
27. A composition prepared by the method of claim 21.

* * * * *